(12) United States Patent
Hawkins et al.

(10) Patent No.: US 12,372,058 B2
(45) Date of Patent: Jul. 29, 2025

(54) SAFETY SYSTEM FOR A WIND TURBINE SYSTEM INCLUDING HYDROGEN PRODUCTION

(71) Applicant: Siemens Gamesa Renewable Energy A/S, Brande (DK)

(72) Inventors: Samuel Hawkins, Vejle (DK); Finn Daugaard Madsen, Billund (DK); Jesper Elliot Petersen, Oelgod (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 20 days.

(21) Appl. No.: 18/553,262

(22) PCT Filed: Mar. 8, 2022

(86) PCT No.: PCT/EP2022/055923
§ 371 (c)(1),
(2) Date: Sep. 29, 2023

(87) PCT Pub. No.: WO2022/214263
PCT Pub. Date: Oct. 13, 2022

(65) Prior Publication Data
US 2024/0183336 A1    Jun. 6, 2024

(30) Foreign Application Priority Data

Apr. 9, 2021 (EP) .................................... 21167622

(51) Int. Cl.
*F03D 7/04* (2006.01)
*F03D 7/02* (2006.01)
(Continued)

(52) U.S. Cl.
CPC .......... *F03D 7/042* (2013.01); *F03D 7/0264* (2013.01); *F03D 9/19* (2016.05); *F03D 9/255* (2017.02);
(Continued)

(58) Field of Classification Search
CPC .......... F03D 7/042; F03D 7/0264; F03D 9/19; Y02E 10/72; Y02E 60/36; F05B 2270/30
See application file for complete search history.

(56) References Cited

U.S. PATENT DOCUMENTS

| 5,592,028 A | 1/1997 | Pritchard |
| 7,075,189 B2 | 7/2006 | Heronemus et al. |
| (Continued) | | |

FOREIGN PATENT DOCUMENTS

| WO | 02084839 A3 | 10/2003 |
| WO | 2013087553 A1 | 6/2013 |
| WO | 2020095012 A1 | 5/2020 |

OTHER PUBLICATIONS

Extended European search, mailing date Sep. 28, 2021.
(Continued)

*Primary Examiner* — Pedro J Cuevas
(74) *Attorney, Agent, or Firm* — Schmeiser, Olsen & Watts LLP (57) ABSTRACT

A safety system of a wind turbine system is provided. The wind turbine system includes at least one wind turbine and a hydrogen production system configured to produce hydrogen using electrical power generated by the wind turbine. The safety system include a monitoring system configured to monitor the wind turbine system to detect a malfunction of the hydrogen production system. It further includes a control system configured to trigger a safety function of the wind turbine system upon detection of a malfunction of the hydrogen production system by the monitoring system.

18 Claims, 4 Drawing Sheets

(51) Int. Cl.
*F03D 9/19* (2016.01)
*F03D 9/25* (2016.01)

(52) U.S. Cl.
CPC ........... *F05B 2270/30* (2013.01); *Y02E 10/72* (2013.01); *Y02E 60/36* (2013.01)

(56) References Cited

U.S. PATENT DOCUMENTS

| | | | |
|---|---|---|---|
| 7,199,482 | B2 | 4/2007 | Hopewell |
| 7,471,010 | B1 | 12/2008 | Fingersh |
| 11,795,842 | B2* | 10/2023 | O'Donnell ........ H01M 8/04074 |
| 11,859,595 | B2* | 1/2024 | Soerensen ................ F03D 1/04 |
| 11,873,741 | B2* | 1/2024 | O'Donnell ............. F03G 6/071 |
| 12,158,088 | B2* | 12/2024 | O'Donnell ........ H01M 8/04074 |
| 2007/0145752 | A1 | 6/2007 | Wobben |
| 2014/0102885 | A1 | 4/2014 | Devine |
| 2018/0202053 | A1* | 7/2018 | Harano ................... C25B 15/00 |
| 2020/0173047 | A1 | 6/2020 | Harano et al. |
| 2023/0026470 | A1* | 1/2023 | Soerensen ................ F03D 7/04 |
| 2023/0279836 | A1* | 9/2023 | Avery ................... F03D 80/003 |
| 2024/0068625 | A1* | 2/2024 | Soerensen ................ F03D 9/19 |
| 2024/0229680 | A1* | 7/2024 | O'Donnell .......... F28D 20/0056 |

OTHER PUBLICATIONS

International Preliminary Report on Patentability, Mailing date Oct. 10, 2023.
PCT International Search Report and Written Opinion of International Searching Authority mailed Jun. 23, 2022 corresponding to PCT International Application No. PCT/EP2022/055923 filed Mar. 8, 2022.

* cited by examiner

SAFETY SYSTEM FOR A WIND TURBINE SYSTEM INCLUDING HYDROGEN PRODUCTION

CROSS-REFERENCE TO RELATED APPLICATIONS

This application claims priority to PCT Application No. PCT/EP2022/055923, having a filing date of Mar. 8, 2022, which claims priority to EP Application No. 21167622.6, having a filing date of Apr. 9, 2021, the entire contents both of which are hereby incorporated by reference.

FIELD OF TECHNOLOGY

The following relates to a safety system of a wind turbine system which includes at least one wind turbine and a hydrogen production system. The following further relates to a method of operating a safety system of a wind turbine system and to a respective computer program for operating such safety system.

BACKGROUND

Wind turbines have traditionally been used for the production of electricity. However, a growing interest is emerging in the use of wind turbines for the production of gaseous hydrogen. Producing hydrogen at the wind turbine location, rather than at remote hydrogen production facility, has many advantages. Water taken from the sea can for example be used in the hydrogen production. Furthermore, the generated electricity does not need to be transported over long distances, thus reducing electric losses.

For example, the document WO 2020/095012 A1 describes an offshore wind turbine system for the large scale production of hydrogen, which includes a floating tower structure with a desalination unit and an electrolysis unit.

Such offshore wind turbine is generally sealed from the environmental air, or it may include devices that limit or avoid the exchange of inside and outside air. By such measures, it can be avoided that air with elevated levels of salinity is introduced into the wind turbine, which may quickly lead to corrosion of internal parts. Similarly, for onshore wind turbines, respective sealing from outside air is provided to avoid that pollutants, flying insects, agricultural debris and the like enter the interior of the wind turbine and may cause damage to components. Furthermore, for both onshore and offshore turbines, regulating the humidity of the interior is also highly important for the avoidance of corrosion and is therefore another reason to ensure a sufficiently sealed nacelle and tower. However, in view of these commonly used configurations of wind turbines, risks may emerge in combination with hydrogen production. It is desirable to mitigate such risks and to avoid dangerous situations in a respective wind turbine or in the vicinity thereof.

The document US 2020/0173047 A1 describes a hydrogen production system, wherein a hydrogen production apparatus is provided within a building at a remote location in a cold area. An inert gas cylinder containing nitrogen is provided to purge water lines and hydrogen lines with inert gas in case of an outage of a facility that provides electrical power to the hydrogen production system.

The document US 2007/0145752 A1 describes a fire protection system for a wind power installation. A fuel cell is arranged within a pylon of the wind power installation to produce an inert atmosphere by consuming oxygen present within the wind turbine. The inert atmosphere prevents the occurrence of fire.

SUMMARY

Accordingly, there is a need to mitigate at least some of the drawbacks mentioned above and in particular to avoid dangerous situations that may occur for wind turbine with co-located hydrogen production.

According to an embodiment of the invention, a safety system of a wind turbine system is provided, wherein the wind turbine system includes at least one wind turbine and a hydrogen production system configured to produce hydrogen using electrical power generated by the wind turbine. The safety system comprises a monitoring system configured to monitor the wind turbine system to detect a malfunction of the hydrogen production system and a control system configured to trigger a safety function of the wind turbine system upon detection of a malfunction of the hydrogen production system by the monitoring system. The triggering of the safety function by the control system includes the control system modifying the operation of the wind turbine.

Such safety system allows a fast and efficient detection of any potentially damaging event occurring due to a malfunction of the hydrogen production system and the taking of fast and efficient mitigation measures. By such safety system, it is particularly possible to avoid that such malfunction, which can lead to an accumulation of hydrogen within the wind turbine system, results in an ignition of such hydrogen and thus in substantial damage to the system. Such safety system can in particular be configured to ensure that the hydrogen concentration within the wind turbine system stays below a flammable or an explosive limit.

Triggering the safety function may in particular include the executing of the safety function by the control system. Triggering a safety function may for example cause the control system to operate the wind turbine and/or the hydrogen production system in a safe mode or to shut down the wind turbine and/or the hydrogen production system.

The hydrogen production system may at least form part of a wind power plant comprising the at least one wind turbine, e.g. a wind farm or a wind park. The hydrogen production system may in particular be co-located with the wind turbine; it may for example be comprised within the wind turbine or arranged adjacent to the wind turbine. In embodiments, the hydrogen production system may be arranged directly adjacent to the wind turbine (e.g. on the same offshore platform or an adjacent offshore platform), and in embodiments, may be comprised within the wind turbine, e.g. within the tower or support structure thereof. It may for example be arranged within less than 500 m, less than 200 m or less than 100 m of the wind turbine. The hydrogen production system may also be associated with plural of the wind turbines of a wind farm. It may be arranged adjacent to plural wind turbines of the wind turbine system, for example on a dedicated offshore platform arranged within an offshore wind farm. As a particular example, the hydrogen production system may form part of a floating offshore wind turbine, which may be configured similar to the one described in the document WO 2020/095012 A1.

In embodiments, the wind turbine may supply the electrical power to the hydrogen production system directly or via a collector grid, i.e. without going through a utility grid or general power grid.

According to embodiments of the invention, the monitoring system comprises a leakage detector configured to detect a leakage of hydrogen from the hydrogen production system in order to detect the malfunction. In a particular implementation, the monitoring system, e.g. such leakage detector, comprises at least one hydrogen gas sensor, wherein a malfunction of the hydrogen production system is detected if a hydrogen concentration detected by the at least one hydrogen gas sensor is above a predetermined threshold. Such configuration allows a fast and efficient detection of the onset of a dangerous situation in the wind turbine system; it in particular allows a triggering of the safety function prior to the occurrence of dangerous hydrogen concentrations. In other implementations, the monitoring system may comprise an ultrasonic detector, by means of which a malfunction in form of a leakage may be detected, upon which the safety function may be triggered.

The at least one hydrogen gas sensor may for example comprise a hydrogen gas sensor arranged within the wind turbine and/or a hydrogen gas sensor arranged within the hydrogen production system. A hydrogen gas sensor may for example be arranged within a tower and/or a nacelle of the wind turbine. In embodiments, it may be arranged in an upper part of the respective system. As hydrogen generally rises, the sensitivity of the monitoring system may thereby be improved. The at least one hydrogen sensor may include hydrogen sensors of one type or of different types, wherein types of hydrogen sensors for example include a MOSFET-type sensor, an electrochemical sensor, a catalytic sensor, a thermal conductivity sensor, and/or metal oxide sensors. The monitoring system may include one or a combination of additional sensors, for example a flame detector, a spark detector, a smoke detector, and the like. These may be provided in addition to a hydrogen gas sensor and may further improve the safety of the wind turbine system by being able to quickly detect a source of ignition.

In an embodiment, the triggering of the safety function by the control system may further include one or a combination of modifying the operation of the hydrogen production system; opening a ventilation port of the wind turbine or of the hydrogen production system; and activating an alarm function. In embodiments, triggering the safety function may include at least two or at least three of these safety measures, in any desired combination. The safety system can thus react quickly in the event of a malfunction to avoid damage to the wind turbine system due to increased hydrogen concentrations.

The ventilation port may for example be arranged in an enclosed space of the wind turbine, such as the tower or the nacelle, and in particular in an upper part thereof, for example at the highest point of a respective enclosed space. As hydrogen is lighter than air, the hydrogen concentration can be lowered efficiently by opening such ventilation port.

Activating an alarm function may for example include the activation of an alarm that is visible to local and remote operators of the wind turbine. The alarm may be configured such that it indicates that an elevated concentration of gaseous hydrogen is present in the wind turbine system. Such alarm may include an audible alarm within the wind turbine, which, in embodiments, may be distinct from other audible alarms, such as fire alarms. Accordingly, personnel within the wind turbine can be informed of the potentially hazardous situation. The alarm may additionally or alternatively include a visual alarm having a warning light of a predetermined color and/or a predetermined timing pattern that is associated with an elevated hydrogen concentration. The alarm may also be communicated to an operator via a communication connection, so that a remote operator is informed about the situation and the malfunction. The type of alarm may depend on the safety function trigger. For a low hydrogen concentration, operation in a safe mode may be triggered which may include one type of alarm, e.g. sound, color, pattern and the like, and for a higher second concentration of hydrogen, a second safety function may be triggered resulting in the activation of a second type of alarm. The type of alarm can thus indicate how high the detected hydrogen concentration is. It may further indicate which mitigation measures the control system has taken, e.g. operation in a safe mode or shutdown of the wind turbine system.

Modifying the operation of the wind turbine may comprise shutting down or disabling operation of at least a sub-system of the wind turbine, and/or modifying the operation of the hydrogen production system may comprise shutting down at least one electrolyzer unit of the hydrogen production system or shutting down the hydrogen production system. The respective shutting down may for example be performed by the controller in dependence on the part of the wind turbine system for which a malfunction, in particular a higher hydrogen concentration, is detected by the monitoring unit. Targeted mitigation measures that reduce the risk of damage may thus be taken.

The control system may be configured to trigger at least one of plural available safety functions in dependence on a risk level associated with the malfunction detected by the monitoring system. The risk level may in particular correspond to a hydrogen concentration measured by the monitoring system, e.g. using the hydrogen gas sensor. A safety function associated with a higher risk level may for example deactivate more components of the wind turbine system than a safety function associated with a lower risk level. More aggressive safety features are thus activated for higher risk levels, so that mitigation measures can be taken gradually in dependence on the actual risk. Functions of the wind turbine system can thus be kept active as long as this is safe.

A hydrogen gas concentration above a first threshold may for example correspond to a first lower risk level, and a hydrogen gas concentration above a second, higher threshold, may correspond to a second, higher risk level, which is then associated with a different safety function as the first lower risk level.

In a particular example, if the monitoring system detects a malfunction by detecting (by a hydrogen gas sensor) that a hydrogen gas concentration is above a first threshold, the control system is configured to trigger a first safety function of the wind turbine system, and if the monitoring system detects a malfunction by detecting (by a hydrogen gas sensor) that a hydrogen gas concentration is above a second threshold, the control system is configured to trigger a second safety function of the wind turbine system, the second threshold being higher than the first threshold. It should be clear that this is only one example, and that further thresholds with respective further safety functions may be employed by the safety system, or that the safety system may gradually invoke additional safety functions upon a rising hydrogen concentration.

The first threshold may for example correspond to a hydrogen concentration selected from a range of 0.2 vol % to 1 vol % in air and/or the second threshold may correspond to a hydrogen concentration selected from a range of 1.0 vol % to 10 vol % in air. In embodiments, the first threshold may be selected from the range of 0.3 to 0.5 vol %, for example about 0.4 vol % (e.g. 0.41 vol %, which corresponds to 4,100 ppm). The first threshold may for example correspond to about 10% of the lower limit for concentrations of gaseous hydrogen to form an explosive mixture with air. By selecting such threshold, the concentrations of hydrogen are low enough that a safety function can still be performed by the wind turbine controller, parts of the wind turbine can continue to operate and that personnel may safely evacuate the wind turbine with neither the wind turbine nor personnel being at risk. In embodiments, the second threshold may correspond to a hydrogen concentration from the range of 1 to 5 vol %, e.g. 1.5 to 3 vol %, for example about 2 vol % (e.g. 2.05 vol % or 20,500 ppm). Such threshold may correspond to about 50% of the lower limit for hydrogen concentration at which a respective explosive mixture is formed with air. Hydrogen is generally flammable when mixed with ordinary air between a concentration of about 4.1 vol % to 70.4 vol % of the air at a pressure of 1 atm. Such threshold is still low enough that the control system can perform a second safety function to reduce the risk of damage.

When the monitoring system detects the occurrence of a malfunction by detecting that the hydrogen concentration reaches or exceeds a respective threshold, it generates a signal that is communicated to the control system which then triggers the respective safety function.

Triggering the safety function, in particular the first safety function (i.e. operation in the safe mode), may in particular comprise disabling (shutting down) the operation of at least one, for example all, rotating electrical machines (generators and motors) in the wind turbine or in at last part of the wind turbine in which an increased hydrogen concentration has been detected. Arcing, which may be caused by slip rings or the like of such machines, can thus be prevented.

As an example, triggering the first safety function may include the performing of one or a combination of the following: A controlled stop of the wind turbine (in particular stopping the electrical power generating system of the wind turbine, i.e. wind turbine rotor, generator, power converter); a shutdown of at least part of the hydrogen production system (e.g. of an electrolyzer); disabling the operation of one or more motor contactors and/or motor breakers; disabling the operation of one or more pumps of the wind turbine, in particular hydraulic fluid and/or gear oil pumps; disabling the operation of one or more fans, in particular cooling or ventilation fans; disabling a hoisting motor, disabling an air-compression unit, in particular of an air-conditioning system. By such measures, it may be ensured that electric arcs, which may for example occur during breaker operation, motor activation and deactivation, and the like, do not act as a source of ignition. Triggering the first safety function may further include continuing the operation of a wind turbine controller; keeping a wind turbine main circuit breaker in a closed position; and continuing the operation of a supervisory control and data acquisition (SCADA) communication equipment. Accordingly, a minimal functionality of the wind turbine may be retained, which allows an operator to communicate with and thus to monitor and control the wind turbine. Triggering the first safety function may further include a continuation of the operation of the safety system; a continuation of the operation of aviation and/or obstruction lighting; a continuation of the operation of local control interfaces and the like. The above measures recited with respect to triggering the first safety function may form part of a safe mode in which the wind turbine system is operated upon triggering the first safety function. Such safe mode may include selected of the above-mentioned measures, and may include any desirable combination of these measures. In embodiments, triggering the first safety function at least includes a controlled shutdown of the wind turbine and continuing the operation of the wind turbine controller, and keeping the wind turbine main circuit breaker in a closed position. It may further include any of the above outlined measures.

A controlled stop of the wind turbine may in particular refer to disabling at least one electrical component of the wind turbine electrical drive train providing the main power flow, in particular a generator, for example a generator and a power converter of the electrical drive train.

In an exemplary implementation, triggering the second safety function, which may correspond to operation in a shutdown mode, may include one or a combination of confirming that a controlled stop of the wind turbine has been performed or performing a controlled stop of the wind turbine; confirming that at least part of the hydrogen production system has been shutdown or performing a shutdown of at least part of the hydrogen production system; performing a full power shutdown of the wind turbine; and opening (automatically) a main circuit breaker of the wind turbine which electrically connects the wind turbine to a power grid or collector system (e.g. a collector grid). By triggering such second safety function, the wind turbine may accordingly be shut down almost completely or completely. The risk of igniting localized concentrations of hydrogen in the internal atmosphere within the wind turbine or the hydrogen production system, which may be above the lower explosive limit, can thereby be reduced significantly. Triggering the second safety function may in particular include the disabling of power supply to all, or nearly all, internal systems within the wind turbine system, including those that had remained powered during the safe mode of operation, i.e. upon triggering the first safety function. For example, triggering the second safety function may include shutdown of SCADA communication equipment and/or shutdown of a wind turbine controller. Respective breakers may be used to shut down the respective wind turbine systems, in particular those which are exposed to high concentrations of gaseous hydrogen. If the SCADA equipment and the wind turbine controller are included in the shutdown mode, then no further remote communication or control may be possible after the shutdown has occurred. In this case, a re-start of the wind turbine may only be possible locally, after safe concentration levels of hydrogen have been achieved.

It is also conceivable that the components of the wind turbine system are only disabled in areas of the system that are at risk of exposure to high concentrations of hydrogen. The monitoring system may for example be configured to monitor a hydrogen concentration at different locations of the wind turbine system for detecting a malfunction, and the control system may be configured to trigger the safety function upon detection of the malfunction for an electrical component at the location of the wind turbine system at which the increased concentration of hydrogen has been detected. As an example, a power system, motor, pump, or the like of the wind turbine, or an electrolyzer of the hydrogen production system, at the respective location, may be shut down.

When triggering the safety function, in particular when operating in the safe mode, the controller may be configured to allow a continued operation of systems at predetermined positions, in particular at positions below the hydrogen production system, outside of the wind turbine, outside of the hydrogen production system, in a portion of the wind turbine that is separate from a portion in which the hydrogen production system is arranged, and/or in a portion of the wind turbine that is (well) ventilated, in particular that includes a ventilation system providing an exchange of air. Accordingly, even if high hydrogen concentrations are measured in some areas, equipment in areas that are unlikely to be exposed to such concentrations can continue to operate.

In an embodiment, the control system is configured to deactivate a triggered safety function upon clearance of the malfunction of the hydrogen production system, in particular upon detection by the monitoring system that a hydrogen concentration has dropped below a threshold. Operation of the wind turbine can thus continue after the malfunction was cleared. For example, when operating in the safe mode, the safe mode may be left again after the hydrogen concentration has dropped sufficiently.

In a particular implementation, the control system may be configured to deactivate the second safety function (in particular resume operation of the wind turbine system under execution of the first safety function) if the hydrogen concentration drops below a third threshold but is above a fourth threshold. Further, the control system may be configured to deactivate the first safety function (in particular resume normal operation of the wind turbine system) if the hydrogen concentration drops below the fourth threshold. Also in such two or more level system, the wind turbine system may thus resume normal operation. This is in particular possible if in the higher level safety functions, a controller operation is still maintained.

The third and/or fourth threshold may for example lie within a range of 30% to 100% of the second/first threshold, respectively, for example in a range of about 40% to 60% of the second/first threshold, e.g. at 50%. For example, the third threshold may lie at about 1 vol % hydrogen concentration in air, e.g. 10,000 ppm, and the fourth threshold may lie at about 0.2 vol % hydrogen concentration in air, e.g. at about 2,000 ppm. Power may thus automatically be restored to the systems previously disabled at the respective safety function level. This may for example include discontinuation of a respective alarm, and returning the wind turbine automatically into operation.

Although the above exemplary implementations relate to a two-level protection system, including a first and a second safety function, it should be clear that other embodiments may implement more levels, e.g. a third, a fourth, . . . safety function, wherein each level further reduces the risk of igniting a concentration of hydrogen, in particular by removing power from systems and/or by providing additional ventilation. Increasingly aggressive mitigation actions can thus be taken at higher levels of hydrogen concentration.

A malfunction of the hydrogen production system may in particular include a leakage in the hydrogen production system or in any hydrogen line connected thereto. The detection of a malfunction of the hydrogen production system may in particular include the detection of an increased hydrogen concentration in the wind turbine or in the hydrogen production system.

According to a further embodiment of the invention, a wind turbine system comprising at least one wind turbine and a hydrogen production system configured to produce hydrogen using electrical power generated by the wind turbine is provided. The wind turbine system further includes a safety system having any of the configurations described herein. In embodiments, the hydrogen production system may be arranged within the wind turbine, in particular within a tower or support structure of the wind turbine. A compact configuration can thus be achieved in which the hydrogen production system is efficiently protected from the environment and in which electrical power needs to be transported only over short distances. The wind turbine may be an offshore wind turbine, and the hydrogen production system may be arranged offshore and co-located with the wind turbine. It may for example be arranged on an offshore platform of the wind turbine, or on an offshore platform adjacent to the wind turbine.

According to a further embodiment of the invention, a method of operating a safety system of a wind turbine system is provided. The wind turbine system includes at least one wind turbine and a hydrogen production system configured to produce hydrogen using electrical power generated by the wind turbine. The method comprises monitoring the wind turbine system to detect a malfunction of the hydrogen production system; and triggering a safety function of the wind turbine system upon detection of a malfunction of the hydrogen production system by the monitoring system. By such method, advantages similar to the ones outlined further above may be achieved.

The method may include any of the method steps described herein with respect to the safety system. The method may be performed by the safety system having any of the configurations described herein.

A further embodiment of the invention provides a computer program for operating a safety system of a wind turbine system, wherein the computer program comprises control instructions which, when executed by a processing unit of a control system of the wind turbine system, cause the processing unit to perform any of the methods described herein. The computer program may be provided on a volatile or non-volatile data carrier or storage medium, or may be provided as a computer program product (non-transitory computer readable storage medium having instructions, which when executed by a processor, perform actions).

It is to be understood that the features mentioned above and those yet to be explained below can be used not only in the respective combinations indicated, but also in other combinations or in isolation, without leaving the scope of embodiments of the present invention. In particular, the features of the different aspects and embodiments of the invention can be combined with each other unless noted to the contrary.

BRIEF DESCRIPTION

Some of the embodiments will be described in detail, with reference to the following figures, wherein like designations denote like members, wherein.

DETAILED DESCRIPTION

In the following, embodiments of the invention will be described in detail with reference to the accompanying drawings. It is to be understood that the following description of the embodiments is given only for the purpose of illustration and is not to be taken in a limiting sense. It should be noted that the drawings are to be regarded as being schematic representations only, and elements in the drawings are not necessarily to scale with each other. Rather, the representation of the various elements is chosen such that their function and general purpose become apparent to a person skilled in the art. As used herein, the singular forms "a," "an," and "the" are intended to include the plural forms as well, unless the context clearly indicates otherwise. The terms "comprising," "having," "including," and "containing" are to be construed as open-ended terms (i.e., meaning "including, but not limited to,") unless otherwise noted.

In the following, embodiments of a safety system for mitigating the risk associated with the operation of a hydrogen production system in a wind turbine system are described. Gaseous hydrogen is a combustible fuel and there are safety risks associated with the production, transport and storage of hydrogen. Hydrogen is exceptionally flammable when mixed with ordinary air. It readily disperses in the air and is flammable when making up anywhere from 4.1% to 74% of the air within a certain volume at 1 atm (101 kPa) of pressure. For these reasons, hydrogen is often labelled as a hazardous material (such as in the NFPA 704 standard, where hydrogen has the highest possible flammability score of 4). Gaseous hydrogen is also an asphyxiant gas and can lead to hypoxia by displacing oxygen. The concentrations which may lead to hypoxia are around 15% to 30% by volume. This is considerably higher than the 4% concentration limit where hydrogen concentrations form an explosive atmosphere. The health and safety risks are therefore generally determined by the explosive atmosphere risk rather than the potential for hydrogen to act as an asphyxiant gas.

Production of hydrogen at a wind turbine location, therefore, poses certain risks associated with gaseous hydrogen. Some properties of gaseous hydrogen are beneficial for avoiding the risk of a fire or explosion. Hydrogen is much lighter than air and will rapidly ascend and disperse. Safety measures to mitigate the risks of hydrogen, which may be implemented in embodiments, may thus include ventilation devices that allow discharged hydrogen to be released upward.

Wind turbines, in particular in an offshore environment, are often sealed from the outside air. The flammability of gaseous hydrogen combined with the potential that leaked hydrogen may become trapped within the interior of the wind turbine leads to a risk of a hydrogen-related fire or explosion when the wind turbine is used for the production of hydrogen. This is both a commercial and safety risk, as hydrogen may not only damage the wind turbine itself but is also odorless and generally undetectable by personnel who might unknowingly be working in an explosive environment. Embodiments of a safety system are thus described below which mitigate the associated risks.

Figure 1:
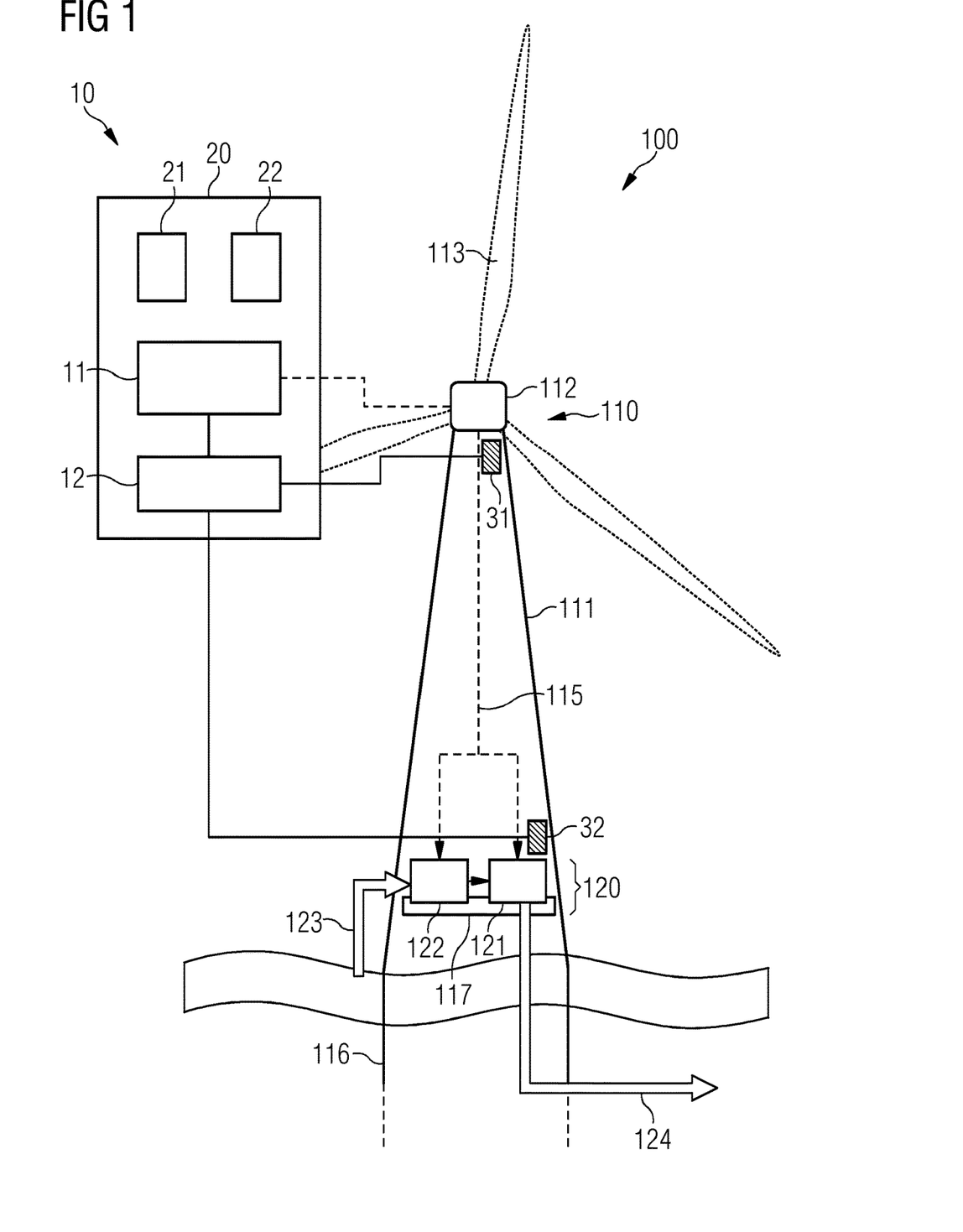
FIG. 1 is a schematic drawing showing a safety system of a wind turbine system according to an embodiment of the invention.

FIG. 1 is a schematic drawing showing a safety system 10 and a wind turbine system 100 according to an embodiment. Wind turbine system 100 includes a wind turbine 110, which in the present example is an offshore wind turbine, but may also be an onshore wind turbine. Wind turbine 110 includes a tower 111 on which nacelle 112 is mounted. Wind turbine rotor 113 is supported by nacelle 112 and converts wind energy into rotational mechanical energy, which is in turn converted into electrical power by a generator arranged in nacelle 112. Wind turbine system 100 further includes a hydrogen production system 120 co-located with wind turbine 110. In the present example, the hydrogen production system 120 is arranged within wind turbine 110, in particular within the tower 111, or within a support structure 116 of wind turbine 110. A cost-efficient solution can thus be achieved in which the hydrogen production system 120 is efficiently protected from the environment. Tower 111 may for example be a tubular steel and/or concrete structure, and it may have internal secondary structures for supporting ladder systems, service lifts, platforms and for hoisting functional wind turbine components.

The hydrogen production system includes a water desalination unit 122 that provides desalinated seawater to an electrolyzer 121. Using the electrical power supplied via a power connection 115 from the wind turbine 110, the electrolyzer produces hydrogen from the water by electrolysis. The produced hydrogen ($H_2$) gas is then transported to an onshore site or a collection vessel by means of export pipe 124. Seawater can be taken up by unit 122 directly from the surrounding seawater using a seawater intake 123. The hydrogen production system may have any of the known configurations and will thus not be explained in greater detail here.

The hydrogen production system 120 can for example be arranged on an internal platform 117 of a tower 111. Foundation 116 may be anchored to the seafloor; it may for example include a jacket structure or the like. The interior of tower 111 is generally sealed from the outside offshore environment. In other implementations, wind turbine 110 may be a floating wind turbine, wherein the support structure 116 may include respective buoyant elements.

The electrical connection 115 may provide electrical power generated by the wind turbine to the hydrogen production system to operate the hydrogen production system, i.e. to be used for producing hydrogen by electrolysis. Power connection 115 may include a communication/control connection. A wind turbine controller of wind turbine 110 may accordingly control or at least communicate with the hydrogen production system 120, for example for coordination purposes and for obtaining the status of the hydrogen production system.

Safety system 10 includes a monitoring system 12 that is configured to monitor the wind turbine system 100 to detect a malfunction of the hydrogen production system 120. Monitoring system 12 can be connected to or may include a leakage detector for detecting the leakage of hydrogen from hydrogen production system 120. It can in particular include hydrogen gas sensors 31 and 32. In the example of FIG. 1, the space within tower 111 may be sealed, and a hydrogen sensor 31 may be placed in the upper part of tower 111 to detect any hydrogen that rises within the tower. A further hydrogen sensor 32 may be placed adjacent to the electrolyzer 121 to detect hydrogen escaping from the electrolyzer. A further hydrogen sensor may be placed within nacelle 112, for example if air is exchanged between tower 111 and nacelle 112. It should be clear that these are only exemplary placements of the hydrogen sensors, and that additional hydrogen sensors may be provided, or the hydrogen sensors may be provided at other suitable locations. Monitoring system 12 can thus detect an increased hydrogen concentration and thus a malfunction of hydrogen production system 120, in particular a hydrogen leak. Respective thresholds may be employed in the detection, as explained in more detail further below.

When detecting such elevated hydrogen concentrations, the monitoring system 12 may provide a respective signal to a control system 11. Upon receiving such signal, the control system 11 takes mitigation measures and in particular triggers a safety function of the wind turbine system 100. Triggering such safety function may be performed by operating the wind turbine system 100 in a safe mode when the hydrogen concentration reaches or exceeds a first threshold, and operating the wind turbine system 100 in a shutdown mode when the hydrogen concentration reaches or exceeds a second threshold. As outlined above, further thresholds and a higher granularity of the safety functions may be employed.

Figure 3:
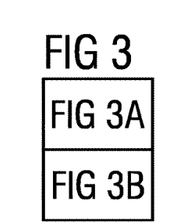
FIG. 3 is a flow diagram illustrating a method according to an embodiment of the invention, wherein the flow diagram includes a first part shown in FIG. 3A and a second part shown in FIG. 3B.
Figure 3A:
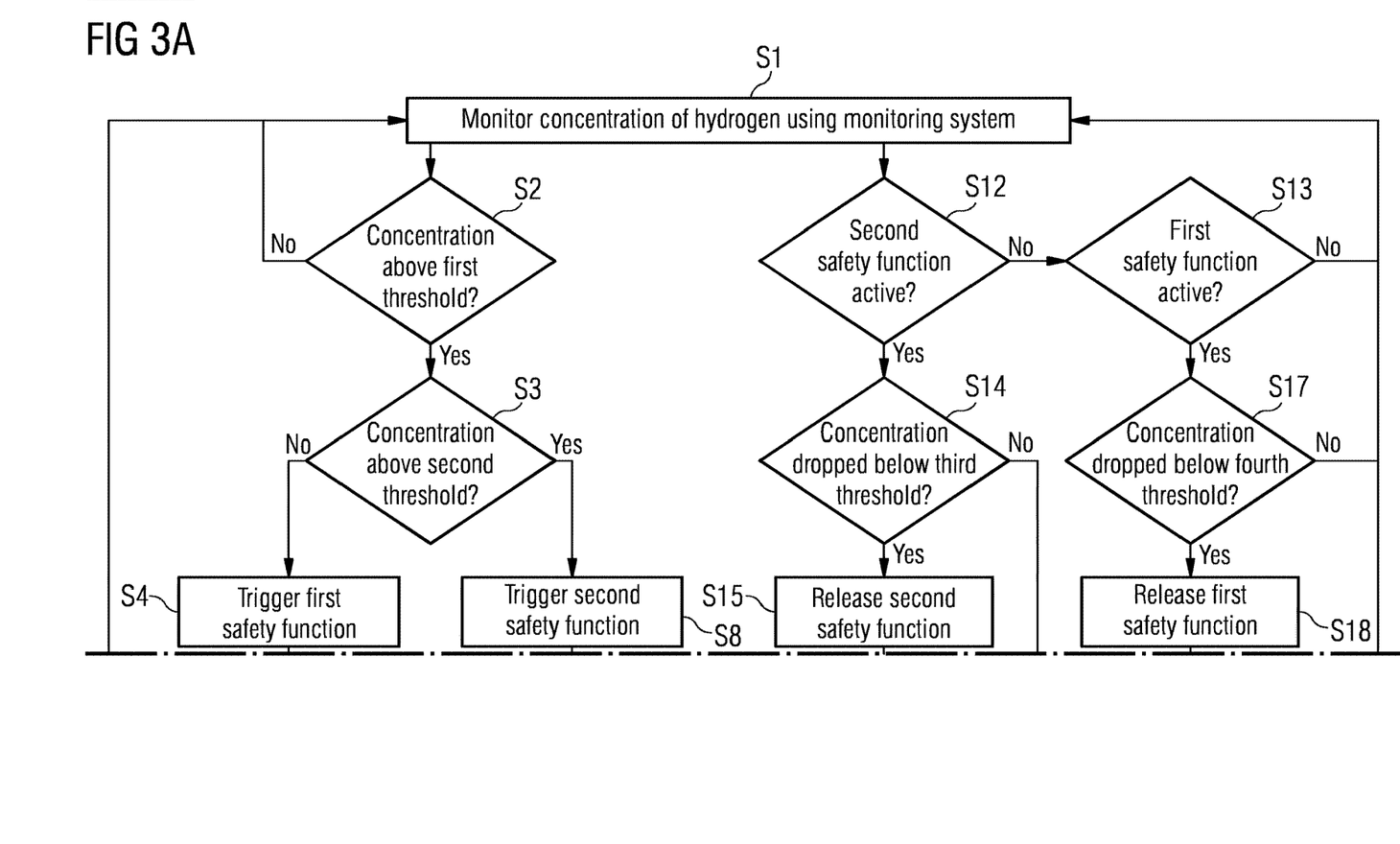
FIG. 3A is the first part of the flow diagram of FIG. 3.
Figure 3B:
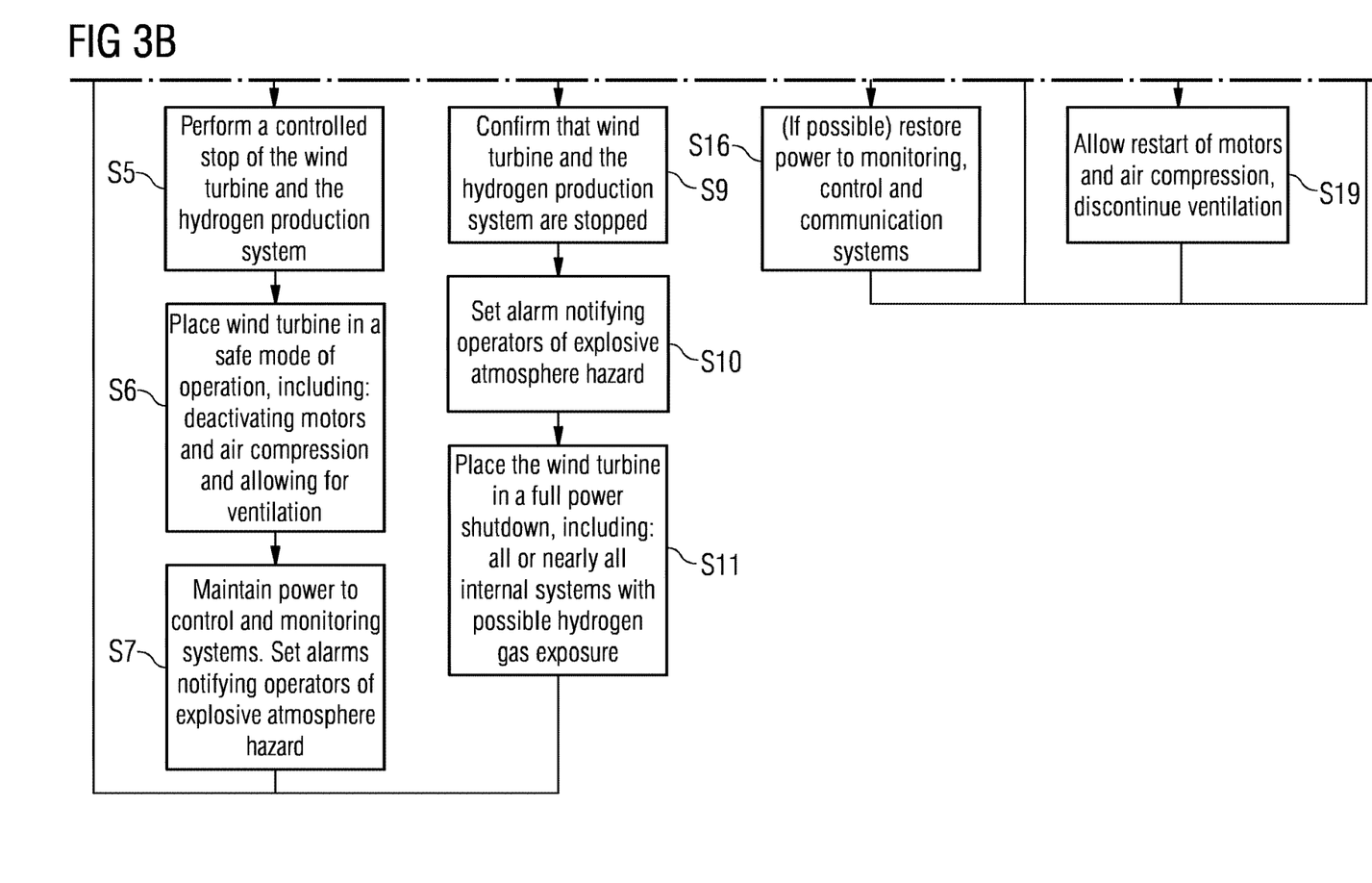
FIG. 3B is the second part of the flow diagram of FIG. 3.

FIG. 3 is a flow diagram that illustrates a respective method that may be performed by safety system 10 when making use of two thresholds for hydrogen concentration. The flow diagram of FIG. 3 includes two parts shown in FIGS. 3A and 3B, wherein the two parts of the flow diagram have to be joined along the dotdashed line. In step S1, the concentration of hydrogen is monitored using the monitoring system 12. In decision step S2, it is checked if the concentration detected by one of the hydrogen sensors 31, 32 is above a first threshold. The first threshold may for example be at about 10% of the lower limit of gaseous hydrogen to form an explosive environment, e.g. at about 0.4 vol %. If this is not the case, monitoring continues in step S1. If the concentration is above the first threshold, it is checked in a further decision step S3 if the measured hydrogen concentration is above a second threshold. If this is not the case, a first safety function is triggered in step S4. Triggering the first safety function is in particular performed by operating the wind turbine system 100 in a safe mode. Such safe mode includes in step S5 the performing of a controlled stop of the wind turbine and of the hydrogen production system 120. A controlled stop of the wind turbine 110 does not imply that all systems are shut down, but only that the electrical drive train that provides the main power flow of generated electrical power is shut down, and that rotation of the wind turbine rotor is stopped.

Operating the wind turbine in a safe mode may include in step S6 the deactivating of motors, e.g. of electrically driven contactors, pumps, fans, and the like and air-compression equipment, and providing ventilation, for example by opening respective ventilation ports which may be provided in an upper section of the tower 111 or in an upper section of nacelle 112. Accordingly, sources of ignition are deactivated, and the hydrogen concentration is reduced by providing ventilation. In step S7, the power towards control and monitoring systems, such as the wind turbine controller and the safety system 10, is maintained. Furthermore, one or more alarms are set in order to notify an operator or service personnel of the explosive atmosphere hazard caused by the escaped hydrogen. Such alarm may comprise respective light signals, audible signals and may include a communication signal sent via a communication link to a respective control center. Not disabling several systems in step S7 has the advantage that the wind turbine 110 remains in a state that allows the (remote) control of the wind turbine and the resuming of operation. Additional sensors and monitoring systems, aviation and obstruction lightning and/or other aircraft and/or vessel navigation aids, local control interfaces such as touch panels and/or keypads and SCADA communication equipment may be kept powered. Monitoring is then continued in step S1.

If in step S3, the concentration of hydrogen is measured to be above a second threshold, a second safety function is triggered in step S8. The wind turbine system 10 may in particular be operated in a shutdown mode. In step S9, it is confirmed that the wind turbine and the hydrogen production system have been stopped (in particular prior to reaching the second threshold). If this is not the case, for example because the second threshold has been reached very quickly, the wind turbine and the hydrogen production system can be powered down in step S9. In step S10, one or more alarms are set which notify the operator or service personnel of the explosive atmosphere hazard. The alarm set in step S10 may be different from the alarm set in step S7 in order to indicate the different and more dangerous concentration of hydrogen. Again, the respective alarm may include visible and audible signals and the notification of a remote operator via a respective communication signal. Light and/or audible signals may for example be different to indicate the higher concentration of hydrogen.

In step S11, the wind turbine 110 is placed in a full power shutdown. This may for example include the shutting down of substantially all internal systems, which are possibly exposed to hydrogen gas. It may for example include all electrical system within tower 111. If the hydrogen gas can enter nacelle 112, it may include all electrical systems within nacelle 112. This may also affect the wind turbine controller of wind turbine 110. The shutdown in step S11 occurs after setting the alarm in step S10, so that the alarm is set even if the controller of the wind turbine is shut down in step S11. If the wind turbine controller remains operational in step S10, then step S11 may also occur prior to step S10. The method may then continue with monitoring the hydrogen concentration in step S1. If the monitoring system is likewise shut down in step S11, and in particular if all electrical systems are shut down in step S11, then the method may end after step S11. A starting of the wind turbine system 100 may then only be possible by service personnel after the respective malfunction has been removed.

When continuing the monitoring in step S1, and the hydrogen concentration raises first above the first threshold and subsequently above the second threshold, then the first safety function will be triggered first, and the second safety function will be triggered subsequently. It should be clear that if a safety function has been triggered, it will not be triggered again if the hydrogen concentration stays the within the same range, i.e. there may be an additional check prior to steps S4 and S8 if the respective safety function has already been triggered (not shown in FIG. 3), in which case monitoring simply continues with the respective safety function in the active state.

The control system may also release the safety functions after they have been triggered. It may be checked in step S12 if the second safety function is active, i.e. has been triggered. If not, it may be checked in step S13 if the first safety function is active, i.e. has been triggered. If not, monitoring continues in step S1.

If it is determined in step S12 that the second safety function has been triggered, it is checked in step S14 if the hydrogen concentration has dropped below a third threshold. If this is the case, then the second safety function can be released in step S15. The third threshold may for example be lower than the second threshold, it may for example be within 30% to 100% of the second threshold. In embodiments, it may be about 50% of the second threshold, for example at about 1 vol % hydrogen concentration. By employing such 'hysteresis', there is no repeated activation/deactivation of the second safety function when the hydrogen concentration is close to the second threshold. In step S16, the power is restored to the monitoring, control and communication systems, to the extent possible (as outlined above, the shutdown may also be such that only a manual restart with on-site service personnel may be possible). Operation can continue in step S1 with the monitoring of the hydrogen concentration. It should be clear that after dropping below the third threshold, the hydrogen concentration may still be above the first threshold, so that operation may continue with the first safety function triggered (step S4), or the first safety function may be activated automatically after release of the second safety function in step S15.

If in step S13, it has been determined that the first safety function is active, it is checked in step S17 if the hydrogen concentration has dropped below a fourth threshold. If in step S17, the hydrogen concentration has not dropped below the fourth threshold, monitoring is continued in step S1. If the concentration has dropped below the fourth threshold in step S17, the first safety function is released in step S18. The fourth threshold may for example be lower than the first threshold, it may for example be within 30% to 100% of the first threshold. In embodiments, it is about 50% of the first threshold, for example at about 0.1 vol % hydrogen concentration. In step S19, motors and air compression are restarted. Optionally, ventilation may be discontinued (e.g. to prevent entry of salt-laden air into the tower or nacelle). In step S19, normal operation of the wind turbine system may in particular be resumed. The method then returns to step S1 in which monitoring is continued.

A dropping of the hydrogen concentration, as determined in steps S14 or S17, may for example be caused by the shutting down of a part or of the complete hydrogen production system. For example, an electrolyzer from which hydrogen is leaking may be shut down. Such electrolyzer may be kept shut down when resuming operation in the normal operating mode or when changing from the shutdown mode to the safe mode. Furthermore, the hydrogen concentration may drop due to the activation of a ventilation system that ventilates the hydrogen into the environment, where it is sufficiently diluted. It should further be clear that also when the hydrogen production system is completely shut down, and the hydrogen levels have dropped sufficiently, the wind turbine 110 can continue to operate and for example to provide electrical power into a power grid instead of to the hydrogen production system.

It should be clear that FIG. 3 is provided only for the purpose of illustration, and that in an exemplary implementation, the four thresholds may be monitored in parallel. More or fewer thresholds and respective safety functions may be provided. Also, step S1 may not necessarily monitor a hydrogen concentration, but may monitor any kind of malfunction of the hydrogen production system. A leakage may for example be monitored, e.g. using a leakage sensor, such as an ultrasonic sensor. Respective thresholds may then for example be defined in dependence on the amount of leakage.

Turning back to FIG. 1, the respective control functions may be performed by the control system 11. Control system 11 may for this purpose for example communicate with a wind turbine controller of wind turbine 110, and/or with a controller of the hydrogen production system 120. The wind turbine controller may also control the hydrogen production system 120, so that communication with such wind turbine controller may be sufficient.

The control system 11 may also be implemented in the wind turbine controller. In such case, the controller 20 may be the wind turbine controller. The control system 11 may, e.g., be a control function of the wind turbine controller. Likewise, the monitoring system 12 may be implemented in the wind turbine controller, which may accordingly be provided with respective communication connections towards the hydrogen sensors 31, 32. In other implementations, the control system 11 and/or the monitoring system 12 may be implemented in a dedicated controller 20. Such controller can for example be arranged in the wind turbine 110, for example in nacelle 112 or tower 111; it may alternatively be arranged in the hydrogen production system 120.

The controller 20 may include a processing unit 21 and a memory 22. The control system 11 and the monitoring system 12 may be implemented as software running on the processing unit 21. Memory 22 may store respective control instructions which are configured such that if they are executed on processing unit 21, any of the methods described herein may be performed. The processing unit 21 may include any type of processor, such as a microprocessor, an application specific integrated circuit, a digital signal processor, or the like. Memory 22 may include volatile and non-volatile memory, in particular RAM, ROM, Flash-Memory, Hard Disk Drives, and the like. Controller 20 may further include input and output interfaces for receiving data, for example from sensors 31, 32, and for transmitting control commands, e.g. to a wind turbine controller or a controller of hydrogen production system 120.

Figure 2:
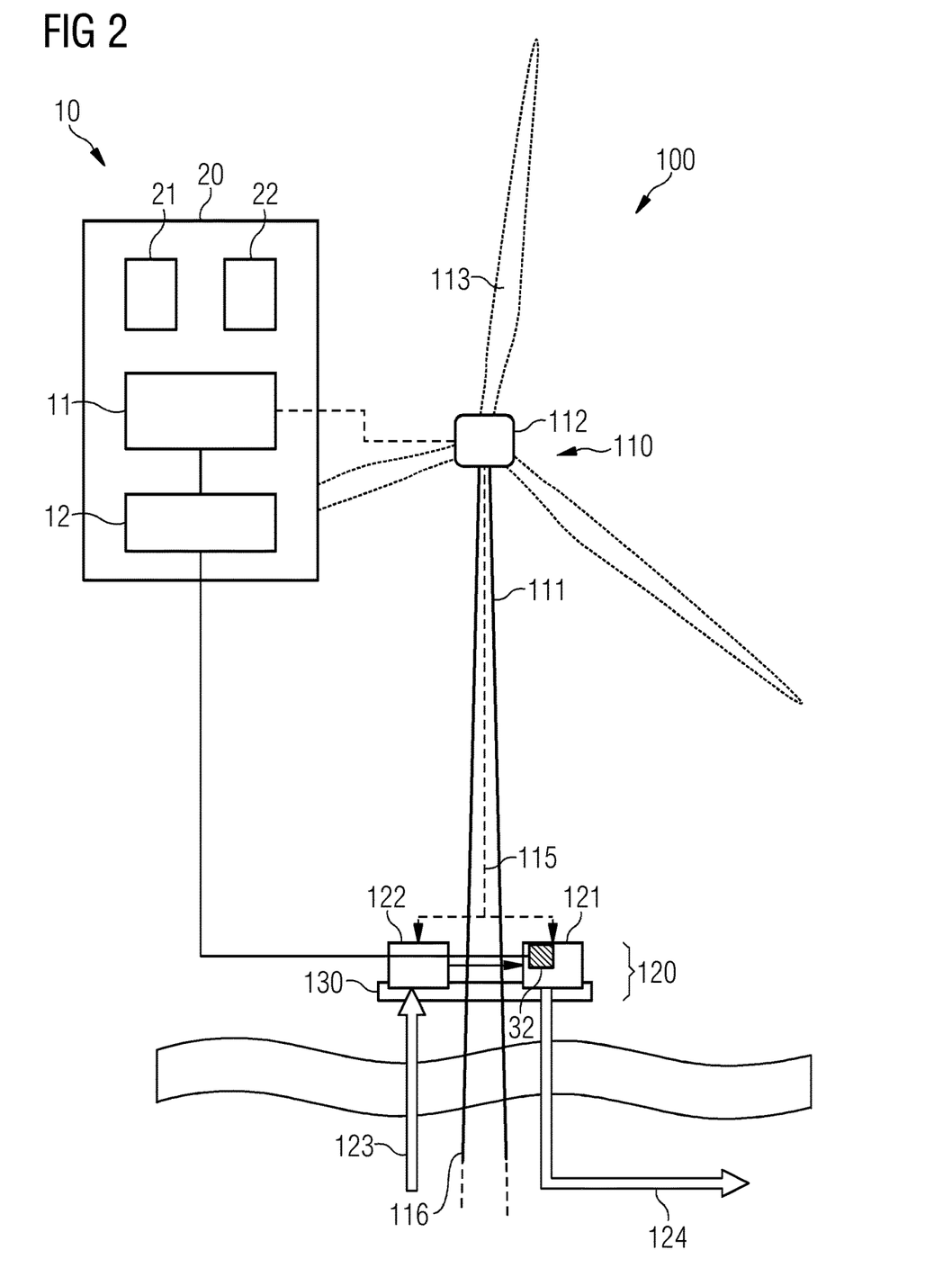
FIG. 2 is a schematic drawing showing a safety system of a wind turbine system according to an embodiment of the invention.

FIG. 2 is a modification of the system of FIG. 1, so that the above explanations are equally applicable and only differences will be explained. In the embodiment of FIG. 2, the hydrogen production system 120 is placed outside the wind turbine 110 and adjacent thereto. An offshore platform 130 is for example supported on the seafloor, e.g. via support structure 116, and the wind turbine 110 and the hydrogen production system 120 are placed on the offshore platform 130. It should be clear that the support structure 116 may essentially be an extension of wind turbine tower 111 and that platform 130 is mounted to such support structure. In a similar way, the hydrogen production system 120 may be placed adjacent to an onshore wind turbine. The components of the hydrogen production system 120 are arranged inside containers configured to protect the components from the environment, in particular the (salt-laden) air and seawater. The hydrogen sensor 32 is in such configuration positioned inside the container of the electrolyzer 121; further hydrogen sensors may not be required. However, it should be clear that additional sensors may be provided in the desalination unit 22 and/or in the wind turbine 110. Triggering the safety function may for example include the control system 11 opening a ventilation port of the hydrogen production system 120, in particular of the container of electrolyzer 121. It may further include any of the other mitigation measures described herein, in particular the partial or full shutdown of the hydrogen production system 120. For example, respective alarm system may be activated and the wind turbine 110 may optionally partially or fully be shut down, as explained herein above and as explained with respect to FIG. 3. Controller 20 may include a communication connection to the hydrogen production system 120 to control a respective ventilation port and/or to shut down part or all of the system 120. When implemented as a wind turbine controller, such communication connection may already exist or may be provided together with the power connection 115.

By the above described embodiments, the risk of the development of an explosive atmosphere in one of the components of wind turbine system 100 and the occurrence of fire or an explosion can be reduced significantly. Health and safety risks for personnel due to hydrogen gas and in particular due to respective fire and explosion can be reduced, and damage to the wind turbine system 100 may be prevented. The safety risk and the commercial risk may thereby be reduced.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A safety system of a wind turbine system, wherein the wind turbine system includes at least one wind turbine and a hydrogen production system configured to produce hydrogen using electrical power generated by the wind turbine, wherein the safety system comprises:
   a monitoring system configured to monitor the wind turbine system to detect a malfunction of the hydrogen production system, wherein the monitoring system comprises a leakage detector, a hydrogen gas sensor, and/or an ultrasonic leakage detector; and
   a control system configured to trigger a safety function of the wind turbine system upon detection of the malfunction of the hydrogen production system by the monitoring system, wherein triggering the safety function by the control system includes at least the control system modifying operation of the wind turbine.

2. The safety system according to claim 1, wherein the monitoring system comprises at least one hydrogen gas sensor arranged within the wind turbine and/or at least one hydrogen gas sensor arranged within the hydrogen production system.

3. The safety system according to claim 1, wherein triggering the safety function by the control system further includes at least one of:
   the control system disabling at least one rotating electrical machine of the wind turbine;
   the control system modifying the operation of hydrogen production system;
   the control system opening a ventilation port of the wind turbine and/or of the hydrogen production system; and
   the control system activating an alarm function.

4. The safety system according to claim 3, wherein modifying the operation of the hydrogen production system comprises shutting down at least one electrolyzer unit of the hydrogen production system or shutting down the hydrogen production system.

5. The safety system according to claim 1, wherein modifying the operation of the wind turbine comprises shutting down or disabling operation of at least a subsystem of the wind turbine.

6. The safety system according to claim 1, wherein the control system is configured to trigger at least one of plural available safety functions in dependence on a risk level associated with the malfunction detected by the monitoring system.

7. The safety system according to claim 1, wherein if the monitoring system detects a malfunction by detecting that a hydrogen gas concentration is above a first threshold, the control system is configured to trigger a first safety function of the wind turbine system, and if the monitoring system detects a malfunction by detecting that a hydrogen gas concentration is above a second threshold, the control system is configured to trigger a second safety function of the wind turbine system, the second threshold being higher than the first threshold.

8. The safety system according to claim 7, wherein the first threshold corresponds to a hydrogen concentration selected from a range of 0.2 vol % to 1 vol % in air and/or wherein the second threshold corresponds to a hydrogen concentration selected from a range of 1.0 vol % to 10 vol % in air.

9. The safety system according to claim 7, wherein triggering the first safety function includes one or a combination of the following:
   a disabling of at least one component of an electrical drive train of the wind turbine;
   a controlled stop of the wind turbine;
   a shutdown of at least part of the hydrogen production system;
   disabling operation of one or more motor contactors and/or motor breakers;
   disabling operation of one or more pumps of the wind turbine;
   disabling operation of one or more fans;
   disabling a hoisting motor;
   disabling an air compression unit;
   continuing operation of a wind turbine controller;
   keeping a wind turbine main circuit breaker in a closed position; and
   continuing operation of Supervisory Control and Data Acquisition, SCADA, communication equipment of the wind turbine.

10. The safety system according to claim 7, wherein triggering the second safety function includes one or a combination of the following:
    confirming that a controlled stop of the wind turbine has been performed or performing a controlled stop of the wind turbine;
    confirming that at least part of the hydrogen production system has been shut down or performing a shutdown of at least part of the hydrogen production system;
    performing a full power shut down of the wind turbine; and
    opening a main circuit breaker of the wind turbine which electrically connects the wind turbine to a power grid or collector system.

11. The safety system according to claim 1, wherein the monitoring system is configured to monitor a hydrogen concentration at different locations of the wind turbine system for detecting a malfunction, and wherein the control system is configured to trigger the safety function upon detection of the malfunction by disabling an electrical component at the location of the wind turbine system at which an increased concentration of hydrogen has been detected by the monitoring system.

12. The safety system according to claim 1, wherein the control system is configured to deactivate a triggered safety function upon clearance of the malfunction of the hydrogen production system.

13. The safety system according to claim 1, wherein the control system is configured to deactivate a triggered safety function upon detection by the monitoring system that a hydrogen concentration has dropped below a threshold.

14. A wind turbine system, comprising:
    at least one wind turbine;
    a hydrogen production system configured to produce hydrogen using electrical power generated by the wind turbine; and
    a safety system including a monitoring system configured to monitor the wind turbine system to detect a malfunction of the hydrogen production system, wherein the monitoring system comprises a leakage detector, a hydrogen gas sensor, and/or an ultrasonic leakage detector; and a control system configured to trigger a safety function of the wind turbine system upon detection of the malfunction of the hydrogen production system by the monitoring system, wherein triggering the safety function by the control system includes at least the control system modifying operation of the at least one wind turbine.

15. The wind turbine system of claim 14, wherein the hydrogen production system is arranged within the at least one wind turbine.

16. The wind turbine system of claim 14, wherein the hydrogen production system is arranged within a tower or support structure of the wind turbine.

17. A method of operating a safety system of a wind turbine system, wherein the wind turbine system includes at least one wind turbine and a hydrogen production system configured to produce hydrogen using electrical power generated by the wind turbine, wherein the method comprises:

monitoring the wind turbine system by a monitoring system to detect a malfunction of the hydrogen production system, wherein the monitoring system comprises a leakage detector, a hydrogen gas sensor, and/or an ultrasonic leakage detector; and triggering a safety function of the wind turbine system upon detection of the malfunction of the hydrogen production system by the monitoring, wherein triggering the safety function includes at least modifying the operation of the wind turbine.

18. A computer program product, comprising a computer readable hardware storage device having computer readable program code stored therein, said program code executable by a processor of a computer system to implement the method of claim 17.

* * * * *